(12) United States Patent
Tas et al.

(10) Patent No.: US 10,401,115 B2
(45) Date of Patent: Sep. 3, 2019

(54) WINDOW MOUNTING ADAPTER FOR M134 MINIGUN TYPE GUNS

(71) Applicant: UNIDEF BIRLESIK SAVUNMA SANAYI TICARET A.S., Deluxia Palas, Istanbul (TR)

(72) Inventors: Serdar Tas, Samsun (TR); Onur Gurdamar, Samsun (TR)

(73) Assignee: UNIDEF BIRLESIK SAVUNMA SANAYI TICARET A.S. (TR)

( * ) Notice: Subject to any disclaimer, the term of this patent is extended or adjusted under 35 U.S.C. 154(b) by 0 days.

(21) Appl. No.: 15/534,824

(22) PCT Filed: Dec. 29, 2016

(86) PCT No.: PCT/TR2016/050570
§ 371 (c)(1),
(2) Date: Jun. 9, 2017

(87) PCT Pub. No.: WO2017/188904
PCT Pub. Date: Nov. 2, 2017

(65) Prior Publication Data
US 2019/0041157 A1    Feb. 7, 2019

(30) Foreign Application Priority Data
Apr. 26, 2016 (TR) .................. 2016 05350

(51) Int. Cl.
*F41A 9/00* (2006.01)
*F41A 27/10* (2006.01)
(Continued)

(52) U.S. Cl.
CPC ............... *F41A 27/10* (2013.01); *B64D 7/02* (2013.01); *F41A 9/79* (2013.01); *F41A 23/20* (2013.01); *B64C 27/04* (2013.01)

(58) Field of Classification Search
CPC . F41A 23/20; F41A 27/10; B64D 7/02; B64D 7/03; B64D 7/04; B64D 7/06
See application file for complete search history.

(56) References Cited

U.S. PATENT DOCUMENTS 4,667,565 A * 5/1987 Anderson ............... F41A 23/20
89/36.08
6,241,185 B1 * 6/2001 Sanderson ............... B64D 7/02
244/118.1
(Continued)

FOREIGN PATENT DOCUMENTS

| FR | 2 963 670 A1 | 2/2012 | |
| FR | 2963670 A1 * | 2/2012 | ............. F41A 23/20 |
| WO | 2013/041956 A1 | 3/2013 | |

OTHER PUBLICATIONS

International Search Report for Application No. PCT/TR2016/050570 dated Apr. 10, 2017.

*Primary Examiner* — Gabriel J. Klein
(74) *Attorney, Agent, or Firm* — Tarolli, Sundheim, Covell & Tummino LLP

(57) ABSTRACT

Invention is about a window mounting adapter for M134 MINIGUN helicopter door mounted machine guns which provides the integration of the gun to the AS 532 AL/UL Cougar and similar types of helicopters, usage of the gun from the window of the helicopter and localization of the needed parts for the gun to work such as cartouche and battery to the optimum place on the platform and without harming it.

10 Claims, 15 Drawing Sheets

Figure 1:
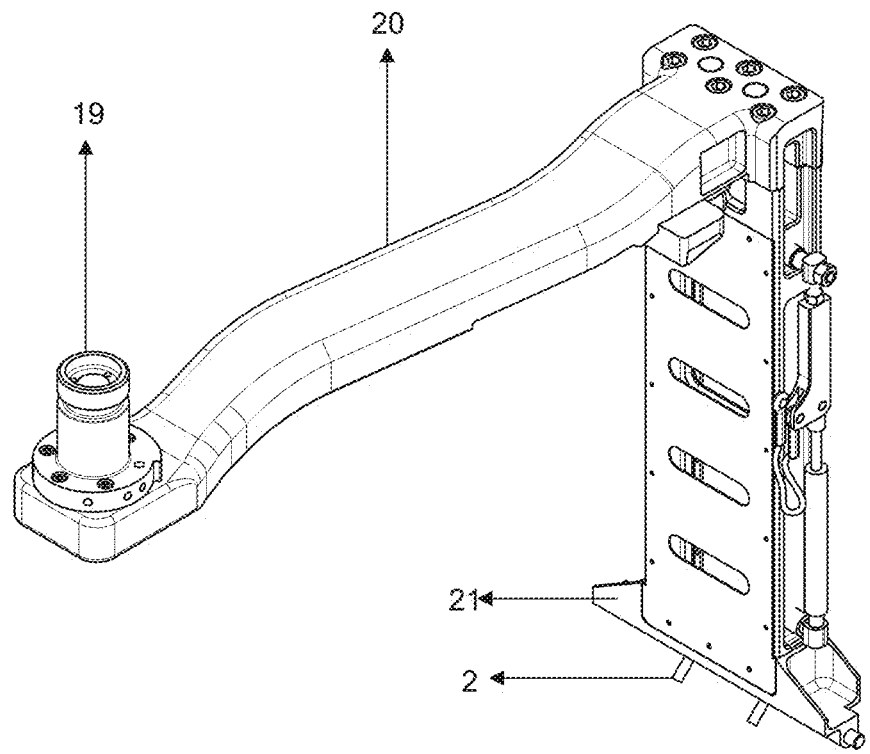

(51) Int. Cl.
*B64D 7/02* (2006.01)
*F41A 23/20* (2006.01)
*F41A 9/79* (2006.01)
*B64C 27/04* (2006.01)

(56) References Cited

U.S. PATENT DOCUMENTS

| | | | | |
|---|---|---|---|---|
| 6,250,196 | B1* | 6/2001 | Sanderson | B64D 7/02 89/37.16 |
| 8,434,397 | B1* | 5/2013 | Deckard | B64D 7/06 89/37.13 |
| 2008/0202326 | A1* | 8/2008 | Carroll | F41A 23/12 89/38 |
| 2010/0126338 | A1* | 5/2010 | Rastegar | F41A 27/26 89/37.13 |
| 2011/0209603 | A1* | 9/2011 | Serkland | B64D 7/06 89/9 |
| 2018/0164066 | A1* | 6/2018 | Leonesio | F41A 17/10 |

\* cited by examiner

WINDOW MOUNTING ADAPTER FOR M134 MINIGUN TYPE GUNS

RELATED APPLICATIONS

The present invention is a U.S. National Stage under 35 USC 371 patent application, claiming priority to Serial No. PCT/TR2016/050570, filed on 29 Dec. 2016; which claims priority from TR 2016/05350, filed on 26 Apr. 2016, the entirety of both of which are incorporated herein by reference.

TECHNICAL FIELD

Invention is about a window mounting adapter for M134 MINIGUN helicopter door mounted machine guns which provides the integration of the gun to the AS 532 AL/UL Cougar and similar types of helicopters, usage of the gun from the window of the helicopter and localization of the needed parts for the gun to work such as cartouche and battery to the optimum place on the platform and without harming it.

Previous Technique

AS 532 AL/UL Cougar helicopter is a general use helicopter and its windows are not designed for arming. That helicopter is used for personnel transportation or search and rescue missions so its doors cannot be used for another purpose. In previous gun applications on that helicopters, shooters could not have the needed firing and visual angle because of narrowness of the windows. Because of the mounting adapter designs, which are used for the integration of the guns, stock of the gun touches to the sides of the window and it causes non-efficient shoots on nose and tail. Besides the gun occupies a big part of the window so the target cannot be seen clearly.

BRIEF DESCRIPTION OF THE INVENTION

Invention is about a mounting adapter suitable with the M134 miniguns and designed to use existing FN Mag58 firing system mounting adapters' connection and locking parts on helicopters while putting the user's and the platform's safety in the first place. And it is aimed to place the cartouche and battery to the platform without making any modification on the platform and use the existing substructure. In mentioned arming processes, perforation and strengthening operations are not preferred on the basement and walls of the helicopter which can be named a modification on the platform and may cause a change in the aerodynamics. For that reason, in our invention no changes are made on the platform and the existing connection parts on the helicopter are used. Existing connection parts on the helicopter are used for the connection of the mounting adapter and the existing seat connection parts on the helicopter are used for the interface connection.

MEANINGS OF THE FIGURES

Figure 16:
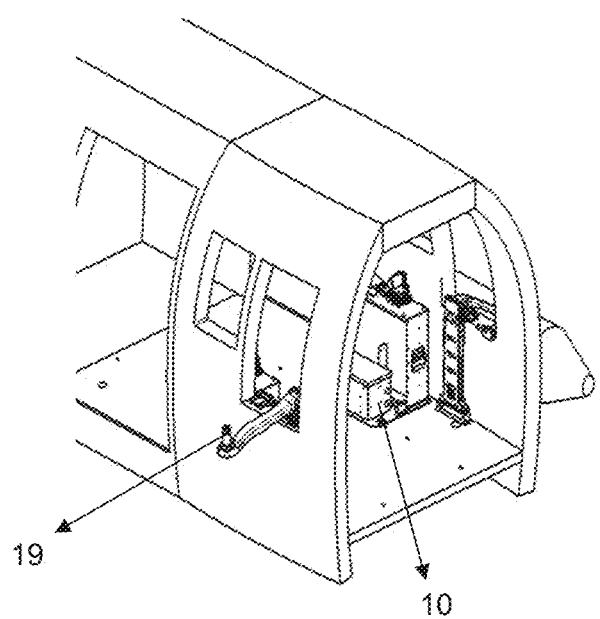
Figure 17:
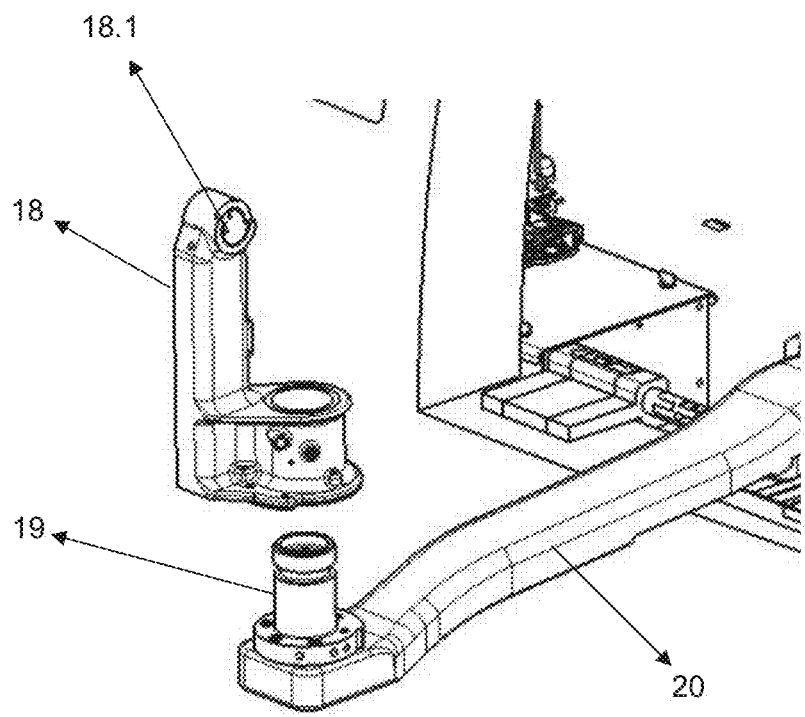

FIG. 1. Window Mounting Adapter Isometric View
FIG. 2. Interface Group Assembled View
FIG. 3. Inside View of the Mounting Adapter Attached to the Floor
FIG. 4. Window Mounting Adapter Upper Locking Canal Bearing
FIG. 5. Inside View of the Window Mounting Adapter Locked to the Upper Locks
FIG. 6. Detailed View of the Safety Connection
FIG. 7. Exploded View of the Interface Group
FIG. 8. Locking Part Unlocked View
FIG. 9. Locking Part Locked View
FIG. 10. Fixing with the Ammunition Belt Box Carriage Arm
FIG. 11. Fixing with the Connection Holes of the Interface Group
FIG. 12. Ammunition Belt Box Rear Locking
FIG. 13. Ammunition Belt Box Front Locking
FIG. 14. Placing of the Mounting Adapter into the Cabin
FIG. 15. Detailed View of Placing of the Mounting Adapter into the Cabin
FIG. 16. Outer View of the Mounting Adapter Attached into the Cabin
FIG. 17. Assembled View of the Vertical Arm on the Mounting Adapter
FIG. 18. Showing the Movement of the Locking Arms of the Connection Part The correspondence of the part numbers indicated in the figures are given below.

1. Floor Connection Part
2. Locking Arms of the Floor Connection Part
3. Locking Pin
4. Locking Channel
5. Safety Cable
6. Helicopter Side Body Fixed Ring
7. Right Directional Floor Part
7.1. Right Directional Floor Part Battery Space
8. Left Directional Floor Part
8.1. Left Directional Floor Part Battery Space
9. Ammunition Belt Box
10. Battery Box
11. Locking Part
11.1. Floor Part Locking Slot
12. Stretcher Assembly
13. Ammunition Belt Box Carriage Ann
14. Fixed Ring
15. Ammunition Belt Box Fixing Parts
16. Ring
17. Locking Belt
18. Vertical Arm
18.1. Hole With A Bush
19. Azimut Pintle
20. Upper Body of Mounting Adapter
21. Lower Body of Mounting Adapter
22. Ammunition Belt Box Docking Part

DETAILED DESCRIPTION OF THE INVENTION

The invention comprises a mounting kit of the mounting adapter to be mounted on the platform, an upper mounting part which enables the interface group and the gun to be mounted on the system. Detailed information about these parts are given below.

A. The Mounting Kit of the Mounting Adapter to be Mounted on the Platform:

The mounting kit to the platform comprised by the subject matter invention is designed to be mounted and fixed on the existing FN Mag58 mounting adapter on the platform floor.

Figure 3:
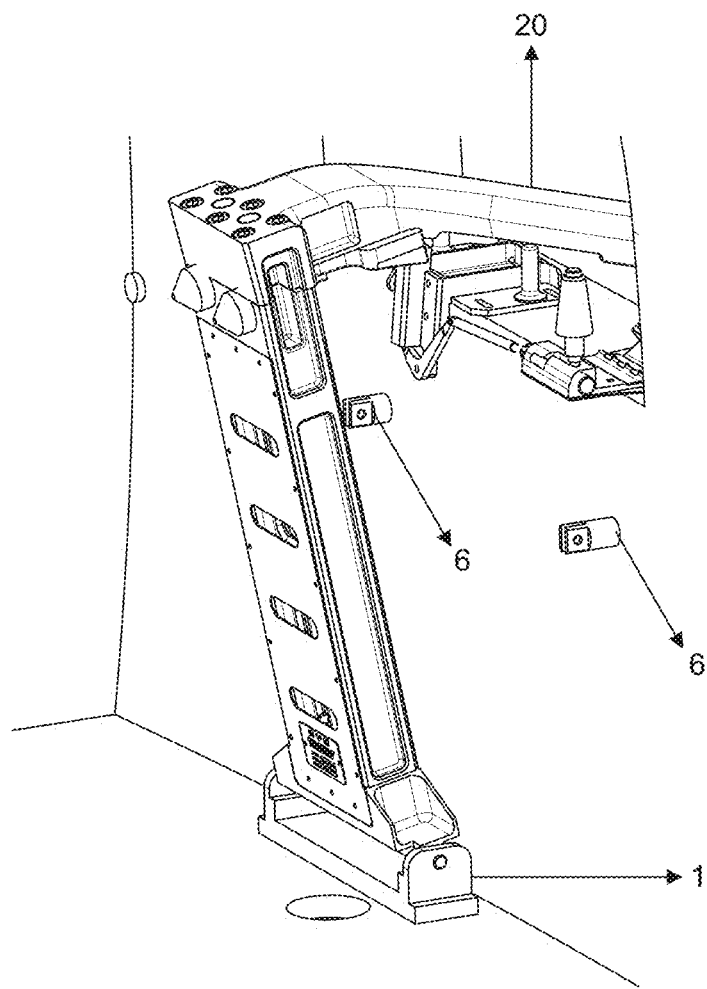
Figure 18:
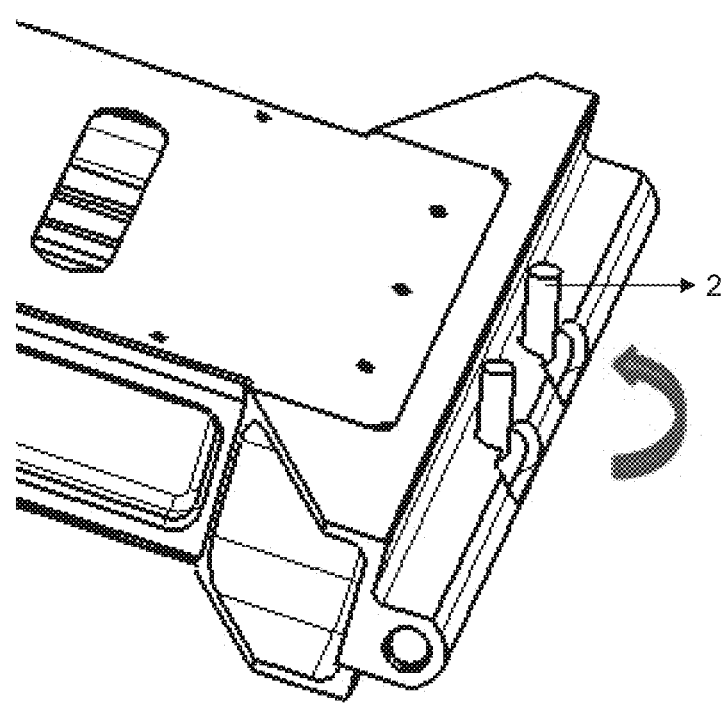

The mounting adapter for M134 minigun type guns are positioned in front of the floor connection part (1) as shown in the FIG. 3. The locking arms of the floor connection part (2), as shown in FIG. 18, are pulled to the center in the arrow direction and the Locking arms of the floor connection part (2) are pulled into mechanism to pass in to the floor connection part (1) and they are placed in their slots. After the positioning of the mounting kit in the floor connection part (1) the locking arms of the floor connection part (2) are set free and mounting of the mounting adapter is provided to the floor connection part (1).

Figure 4:
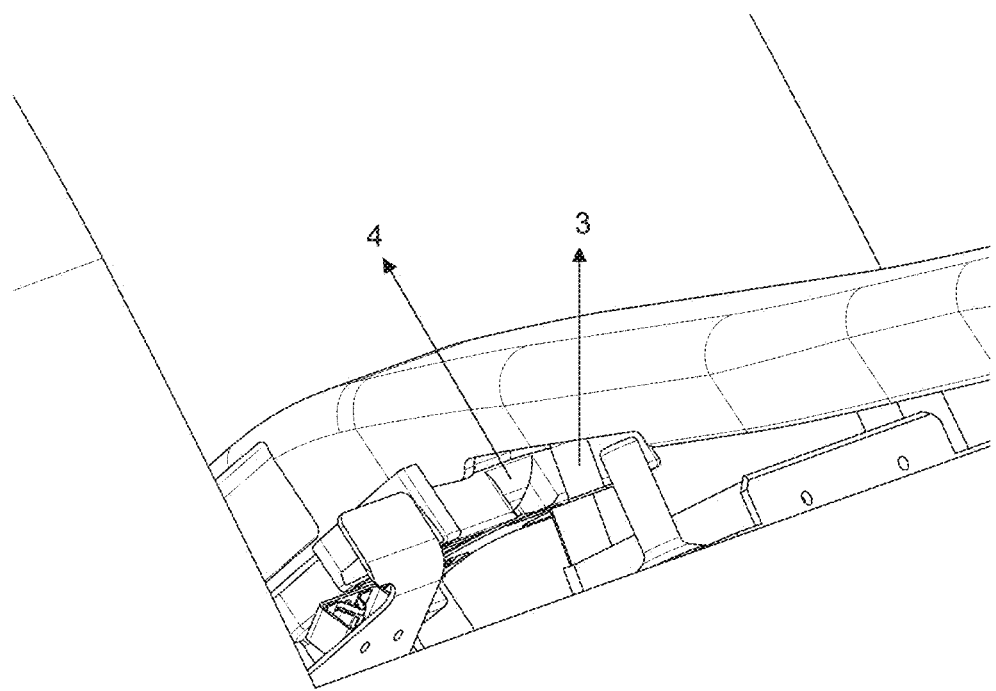
Figure 5:
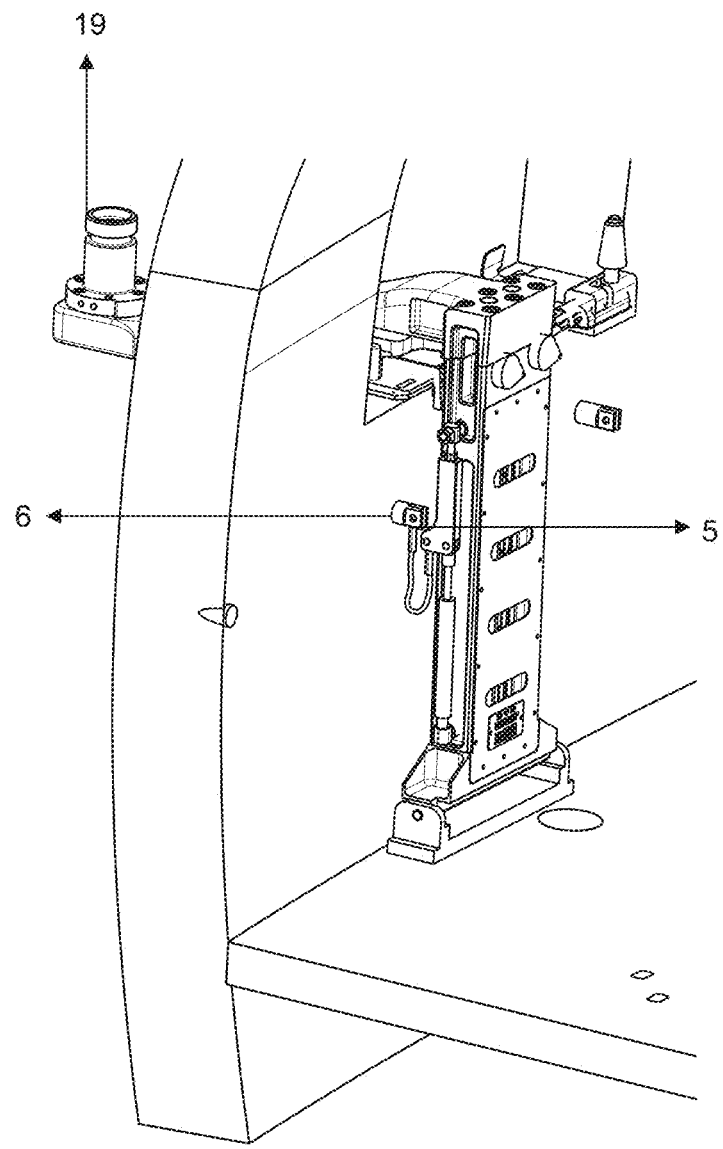
Figure 6:
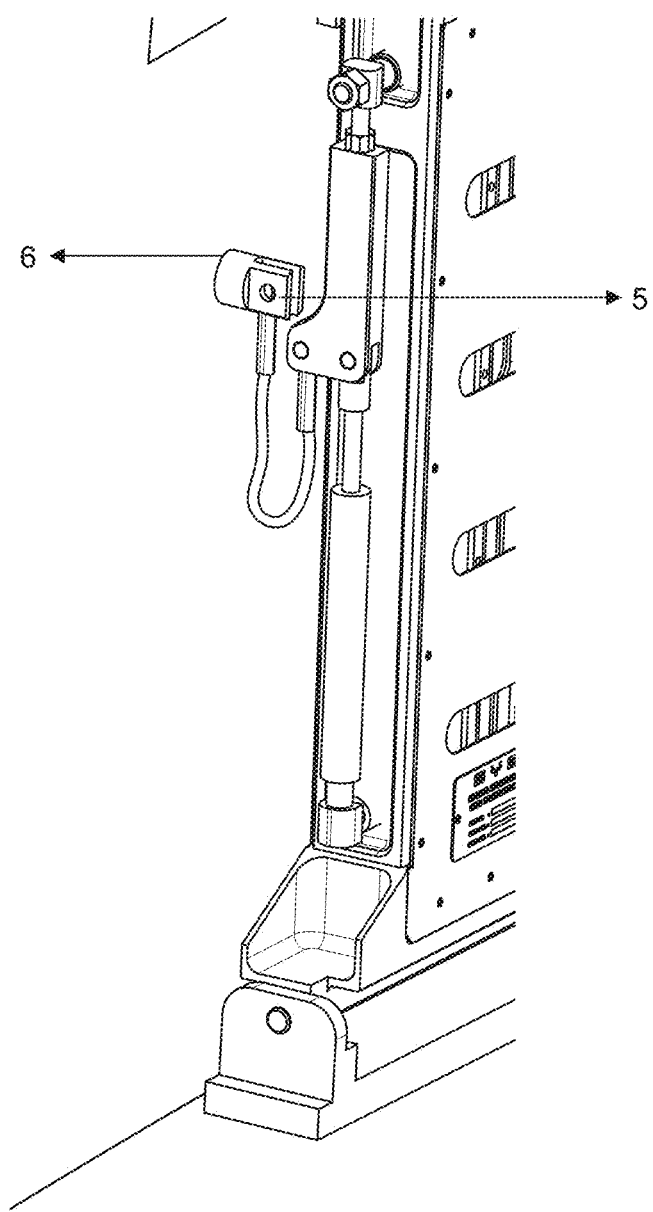
Figure 7:
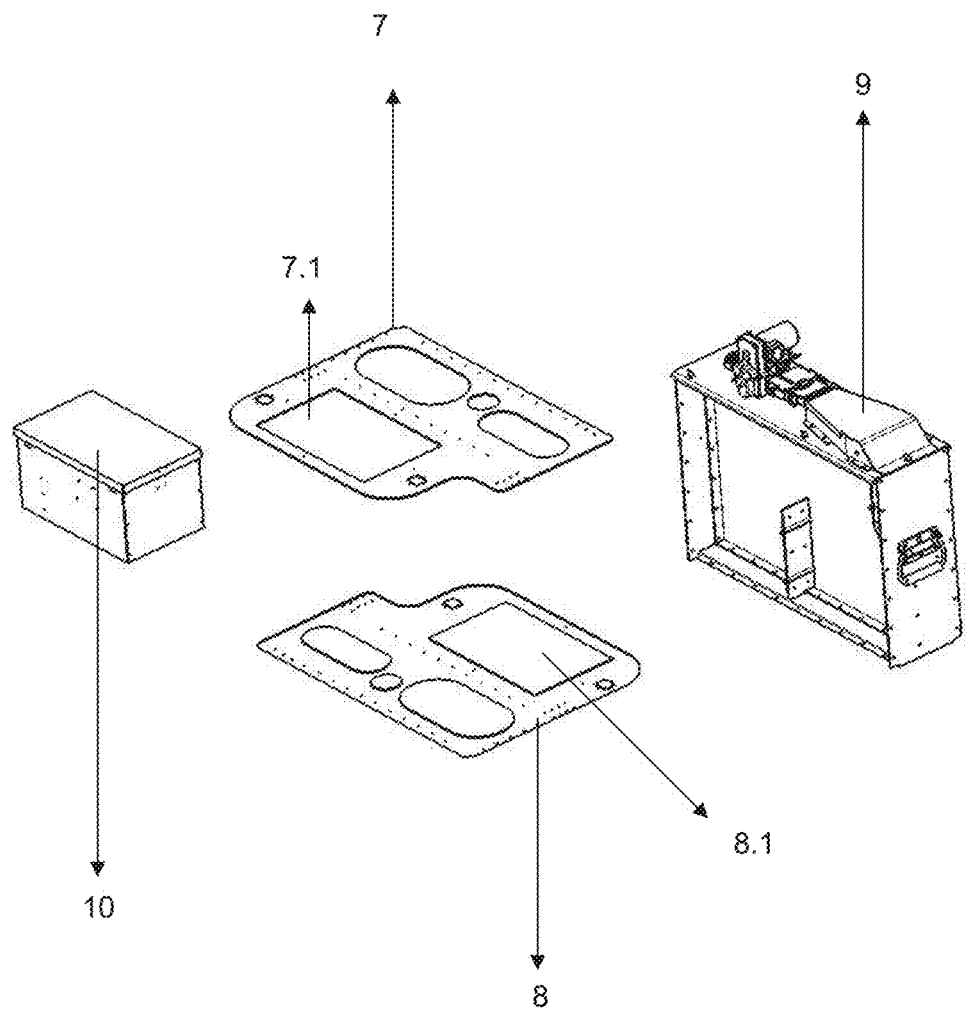

After mounting the mounting adapter to the floor connection lock, it is rotated in the floor connection axis to the clockwise as shown in FIG. 3, it is pushed on the locking pin (3) which is placed inner side of the window. To mount the mounting adapter to the locking mechanism inside of the window, the locking pin (3) is passed through the locking channel (4) as shown in FIG. 4. The mounting adapter which is fixed with the locking mechanism in the window, is now set to the fire ready position as shown in FIG. 5. The mounting adapter, which is set to the fire ready position with the locking mechanism in window, is hooked to the helicopter side body fixed ring (6) by the safety cable (5) to prevent the mounting adapter fall on to the platform and harm the user or the platform as shown in FIG. 6.

B. Interface Group:

The interface group comprises 4 sub-groups (equipment included), which is designed in a purpose of placing the M134 minigun type gun's supportive equipment that is going to be used with the mounting adapter in to the platform:

I. Right Directional Floor Part (7)
II. Left Directional Floor Part (8)
III. Ammunition Belt Box (9)
IV. Battery Box (10)

Figure 8:
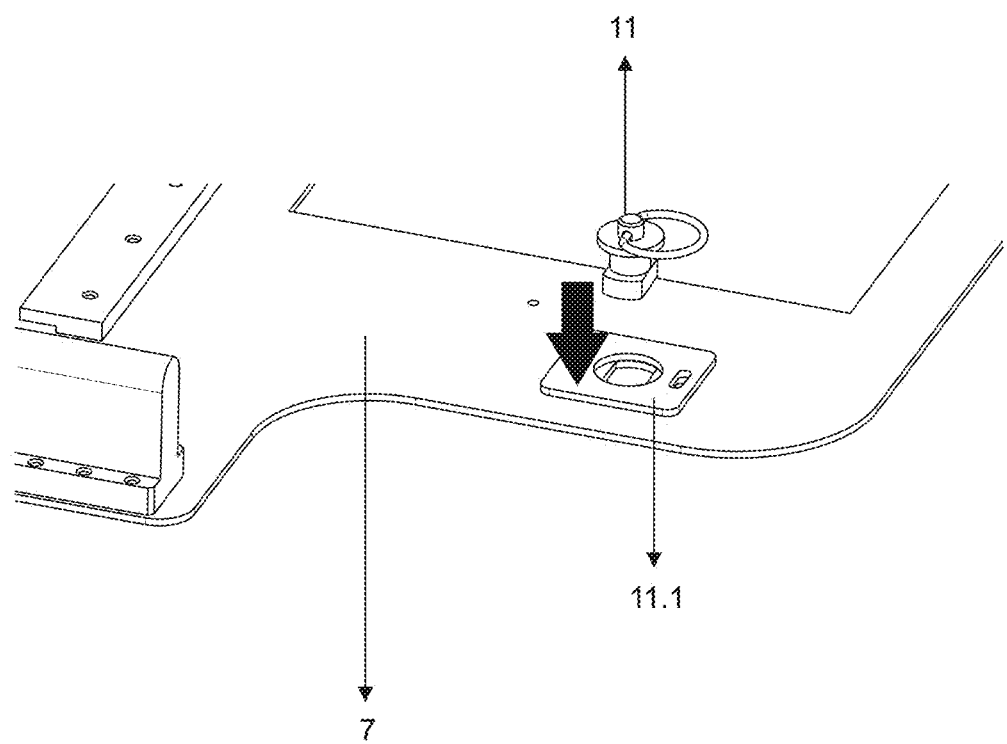
Figure 9:
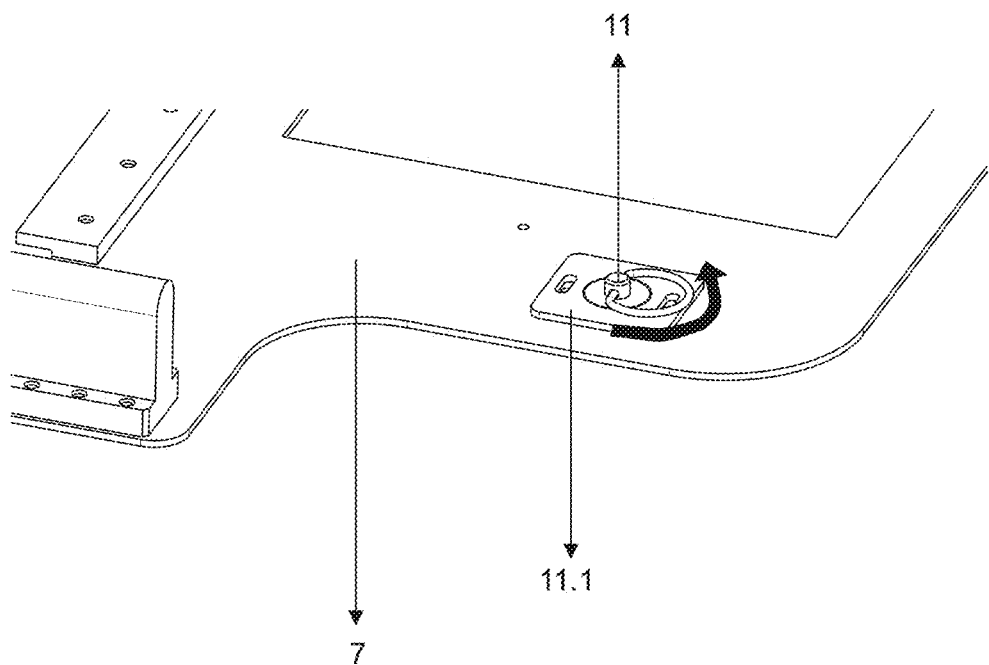

The right directional floor part (7) and the left directional floor part (8), which are designed for the subject matter invention, provides a mount without any modification on the floor of the AS 532 AL/UL Cougar type helicopter by using the existing substructure of platform. The right directional floor part (7) and the left directional floor part (8) are placed in the platform and the locking part (11) is passed through the floor part locking slot (11.1) in the arrow direction as shown in FIG. 8. The locking part (11) which is passed through. The right directional floor part (7) and the left directional floor part (8) and it is rotated counter clockwise and the mounting procedure of the said floor part to the platform is completed as shown in FIG. 9.

Figure 2:
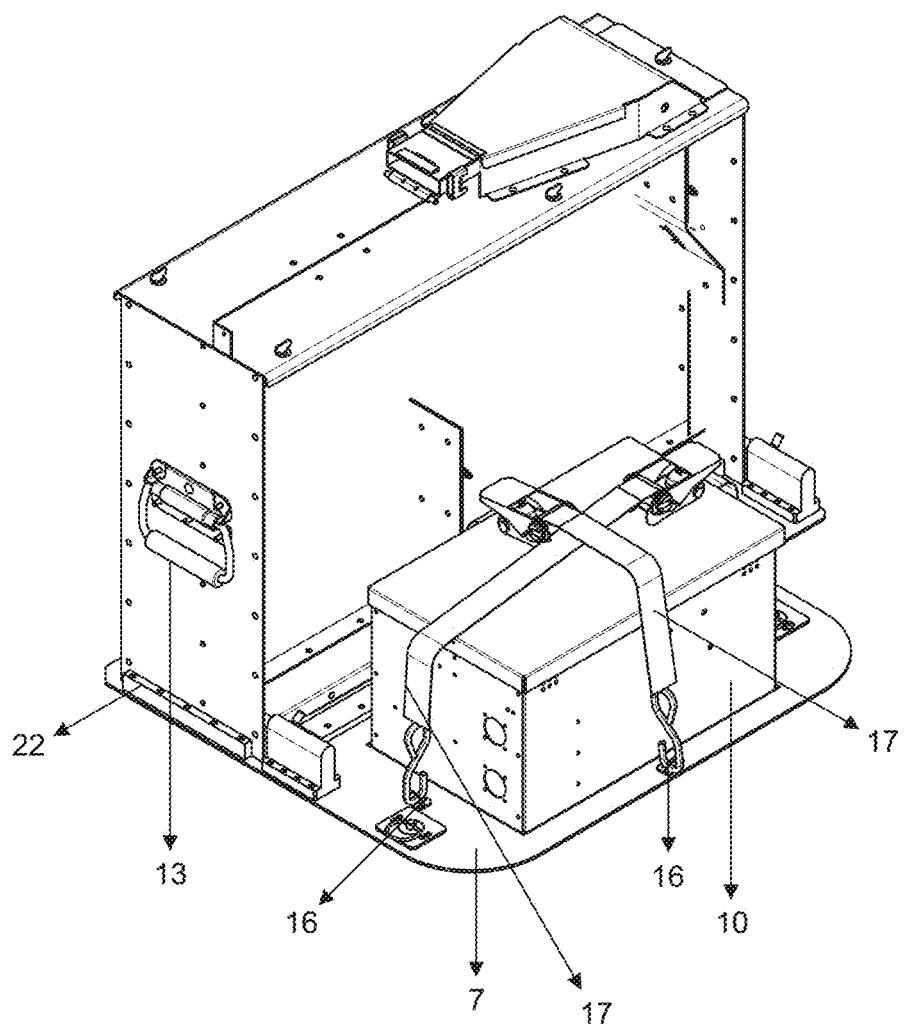
Figure 12:
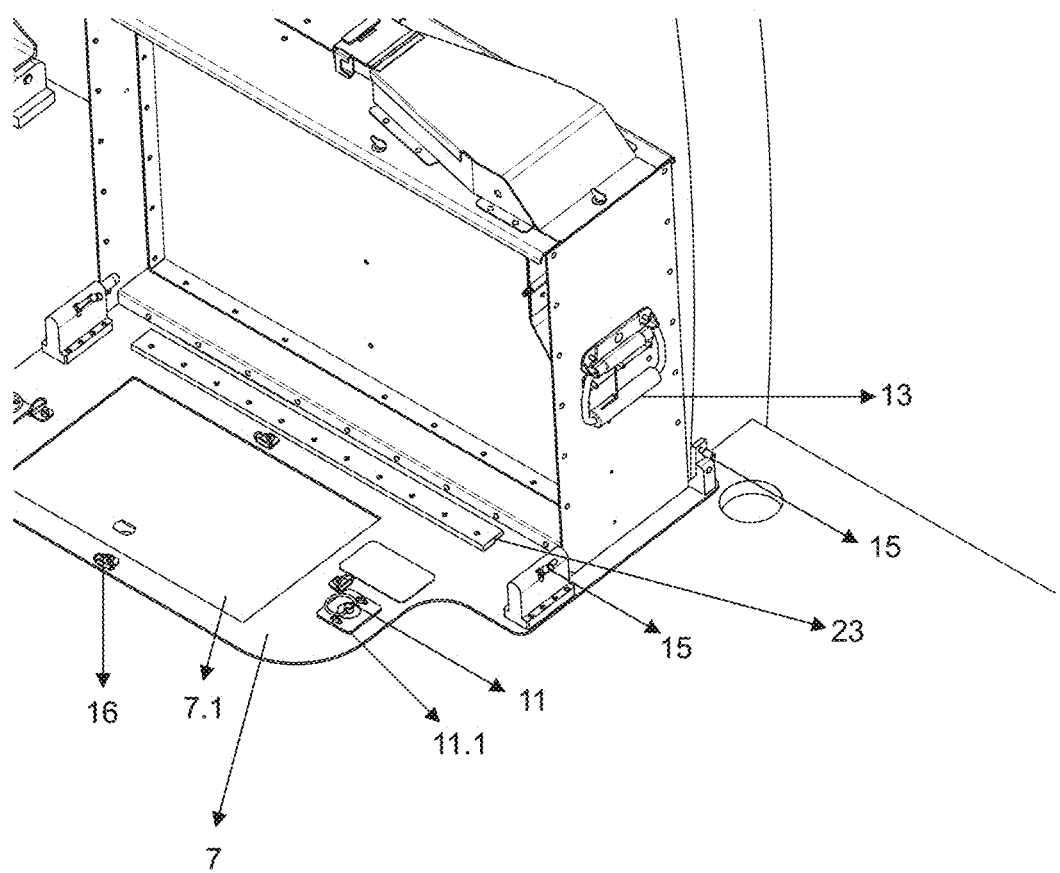
Figure 13:
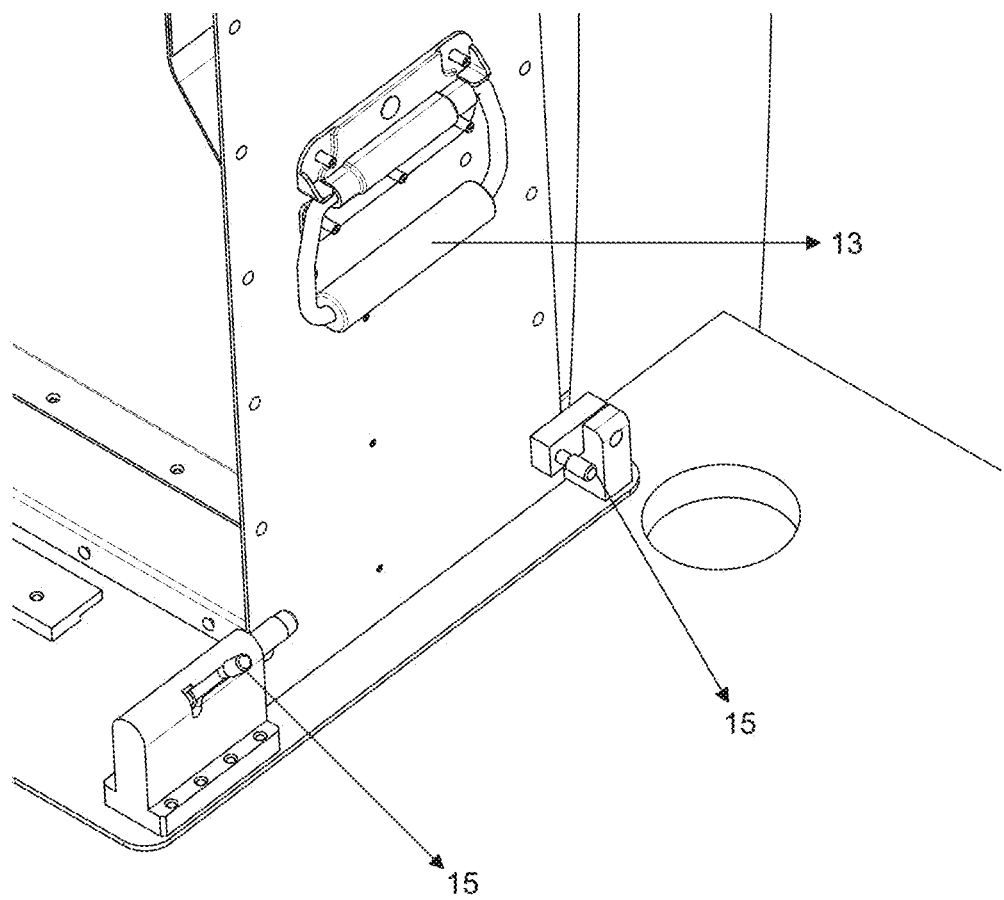

After the right directional floor part (7) and the left directional floor part (8) are mounted on the platform, the ammunition belt box (9) are passed through the ammunition belt box docking parts (22) that are placed on the floor part and it is fixed by using the ammunition belt box fixing parts (15) as shown in FIG. 12 and FIG. 13. The battery box (10) is also fixed by being placed on the right directional floor part battery space (7.1) and the left directional floor part battery space (8.1) and being tightened with the locking belt (17) on the right directional floor part (7) and the left directional floor part (8) as shown in FIG. 2.

Figure 10:
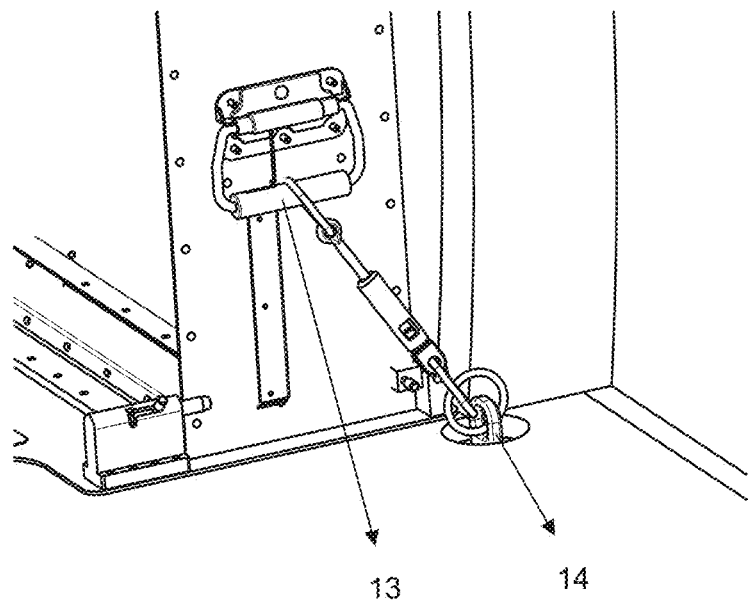

The right directional floor part (7) and the left directional floor part (8) are fixed on the middle section of the platform. After the ammunition belt box is placed, by using the ammunition belt box carriage arm (13); a fixing procedure is applied as shown in FIG. 10 between the stretcher assembly (12) and the fixed rings (14) which are placed in the door entrances on the platform. With that connection, interface group is totally mounted on the platform floor.

Figure 11:
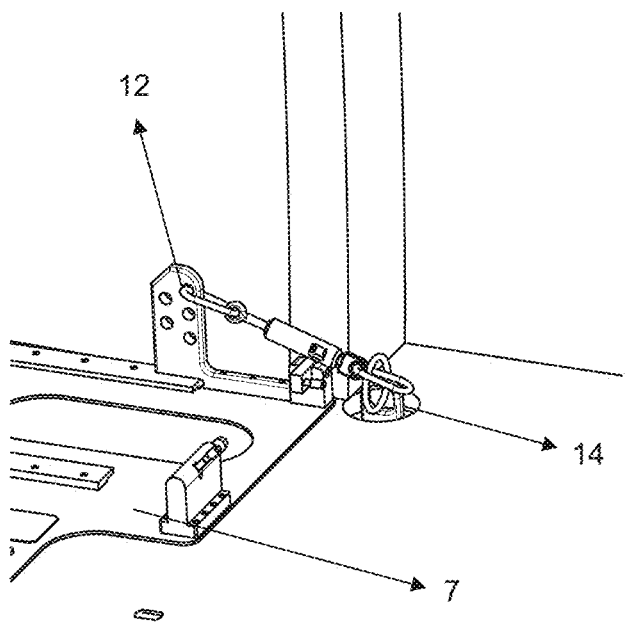

Firstly, the ammunition belt box (9) is mounted on the interface group which is already mounted on the platform floor. The ammunition belt box fixing parts (15) placed on the ammunition belt box (9) must be in open position as shown in FIG. 12 and FIG. 13. While the ammunition belt box fixing parts (15) are in open position, the ammunition belt box (9) is placed by being put between the front and the rear ammunition belt box docking parts (22) as shown in FIG. 11. After the ammunition belt box (9) is placed on the right directional floor part (7) and the left directional floor part (8), the locking procedure is done by passing the ammunition belt box fixing parts through the holes on the ammunition belt box docking part (22) as shown in FIG. 12 and FIG. 13. With that procedure the ammunition box (9) is fixed between the ammunition belt box docking part (22) and the ammunition belt box fixing parts (15). After the ammunition belt box (9) is placed on the right directional floor part (7) and the left directional floor part (8), the battery box (10) is also fixed by being placed on the right directional floor part battery space (7.1) and the left directional floor part battery space (8.1) as shown in FIG. 2. The battery box (10) which is placed to its spot, is tightened with the locking belt (17) being hooked to the rings (16) on the right directional floor part (7) and the left directional floor part (8) as shown in FIG. 2.

Figure 14:
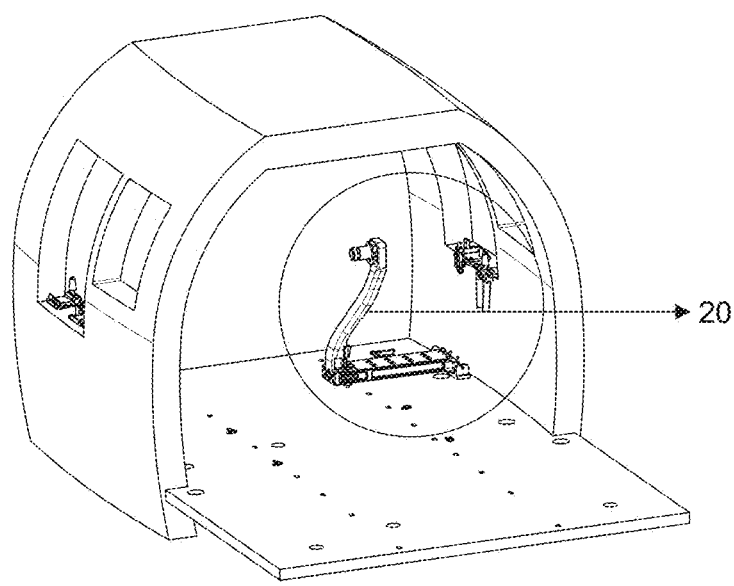

C. Upper Mounting Part:

After the mounting kit of the mounting adapter to be mounted on the platform and the interface group are mounted on the platform, the M134 Minigun becomes adaptable to the system. Mounted versions of the mounting kit of the mounting adapter to be mounted on the platform and the interface group are shown in FIG. 14.

Figure 15:
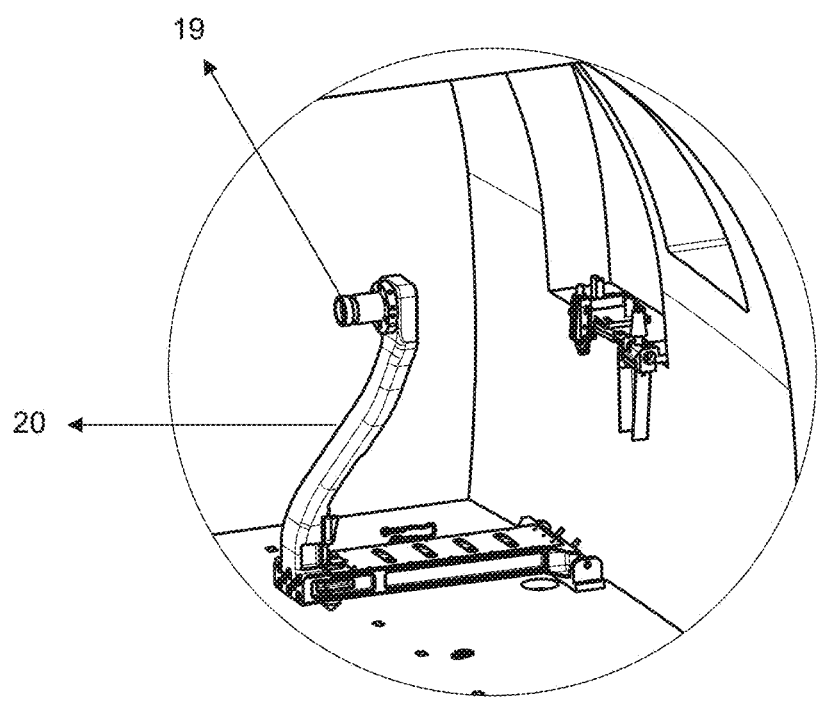

Mentioned M134 minigun type gun is connected to the system with a part named vertical arm (18) which has an international usage standard. Vertical arm (18) is placed on the azimut pintle (19) that is placed on the upper body of mount adapter (20) in the (−y) axis as shown in FIG. 15. The azimut pintle (19) provides mounting of above mentioned vertical arm (18) to the mounting adapter. The vertical arm (18) is locked and fixed by being put on the azimut pintle (19) and it cannot be taken out again. After that fixing procedure, the vertical arm (18) can move rotationally around of it centerline.

M134 minigun is pushed through the hole with a bush (18.1) placed on upper side of the vertical arm (18) after the vertical arm (18) is fixed on the mounting adapter. And it is fixed on the vertical arm (18) by using locked pin placed on the minigun. The rotational moves of the minigun can be controlled after it is fixed on the mounting adapter.

The invention claimed is:

1. A window mounting adapter for an M134 Minigun characterized by comprising; a floor connection part, a multiple of locking arms of the floor connection part, a locking pin, a locking channel, a safety cable, a helicopter side body fixed ring, a right directional floor part, a right directional floor part battery space, a left directional floor part, a left directional floor part battery space, an ammunition belt box, a battery box, a locking part, a floor part locking slot, a stretcher assembly, an ammunition belt box carriage arm, a fixed ring, ammunition belt box fixing parts, a ring, a locking belt, a vertical arm, a hole with a bush, an azimuth pintle, an upper body of the mounting adapter, a lower body of the mounting adapter.

2. The window mounting adapter of claim 1, wherein the multiple of locking arms of the floor connection part are characterized by being parts which provide a mounting on the floor connection part by intertwining into the floor connection part.

3. The window mounting adapter of claim 1, wherein the locking pin is characterized by providing a mount of the mounting adapter in front of a window by passing through the locking channel.

4. The window mounting adapter of claim 1, wherein the safety cable is characterized by being hooked to the helicopter side body fixed ring to prevent the mounting adapter from falling onto a platform.

5. The window mounting adapter of claim 1, wherein the right directional floor part is characterized by being mountable on a floor of an AS 532 AL/UK Cougar helicopter without any modification.

6. The window mounting adapter of claim 1, wherein the left directional floor part is characterized by being mountable on a floor of an AS 532 AL/UK Cougar helicopter without any modification.

7. The window mounting adapter of claim 1, wherein the locking part is characterized by passing through the floor part locking slot and provides locking of the right directional floor part and the left directional floor part by being rotated counter clockwise.

8. The window mounting adapter of claim 1, wherein the locking belt is characterized by fixing the battery box on the right directional floor part battery space and the left directional floor part battery space and on the right directional floor part and the left directional floor part.

9. The window mounting adapter of claim 1, wherein the ammunition belt box fixing parts are placed on the ammunition belt box and are, characterized by letting the ammunition belt box be pulled off from an ammunition belt docking part in an open position.

10. The window mounting adapter of claim 1, wherein the ammunition belt box fixing parts are placed on the ammunition belt box and are, characterized by fixing the ammunition belt box on an ammunition belt box docking part in a closed position.

* * * * *